United States Patent
Barinov et al.

(10) Patent No.: US 10,432,411 B2
(45) Date of Patent: Oct. 1, 2019

(54) SYSTEM AND METHOD FOR FILE TIME-STAMPING USING A BLOCKCHAIN NETWORK

(71) Applicant: Acronis International GmbH, Schaffhausen (CH)

(72) Inventors: Igor Barinov, San Mateo, CA (US); Victor Lysenko, Moscow (RU); Serguei M. Beloussov, Costa Del Sol (SG); Stanislav Protasov, Moscow (RU); Mark Schmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 185 days.

(21) Appl. No.: 15/591,294

(22) Filed: May 10, 2017

(65) Prior Publication Data
US 2017/0331635 A1    Nov. 16, 2017

Related U.S. Application Data

(60) Provisional application No. 62/334,071, filed on May 10, 2016.

(51) Int. Cl.
H04L 29/06    (2006.01)
H04L 9/32    (2006.01)
H04L 9/06    (2006.01)

(52) U.S. Cl.
CPC .......... H04L 9/3297 (2013.01); H04L 9/0643 (2013.01); H04L 9/3226 (2013.01); H04L 9/3236 (2013.01); H04L 2209/38 (2013.01); H04L 2209/56 (2013.01)

(58) Field of Classification Search
CPC . H04L 2209/38; H04L 9/3236; H04L 9/3297; H04L 9/0643
See application file for complete search history.

(56) References Cited

U.S. PATENT DOCUMENTS

| | | | |
|---|---|---|---|
| 2017/0017955 A1* | 1/2017 | Stern | G06Q 20/36 |
| 2017/0177898 A1† | 6/2017 | Dillenberger | |
| 2017/0213209 A1† | 7/2017 | Dillenberger | |

\* cited by examiner
† cited by third party

*Primary Examiner* — Dao Q Ho
(74) *Attorney, Agent, or Firm* — Arent Fox LLP; Michael Fainberg

(57) ABSTRACT

A system and method is provided for storing data and ensuring integrity and reliability of the data using blockchain technology. An exemplary method is provided for time-stamping a file to be added to a blockchain network. The method includes generating a data file; identifying a hash value from a first block previously recorded in the blockchain network; embedding a beacon relating to the hash value in the data file; and recording the data file with the embedded beacon as a transaction in a second block in the blockchain network.

14 Claims, 9 Drawing Sheets

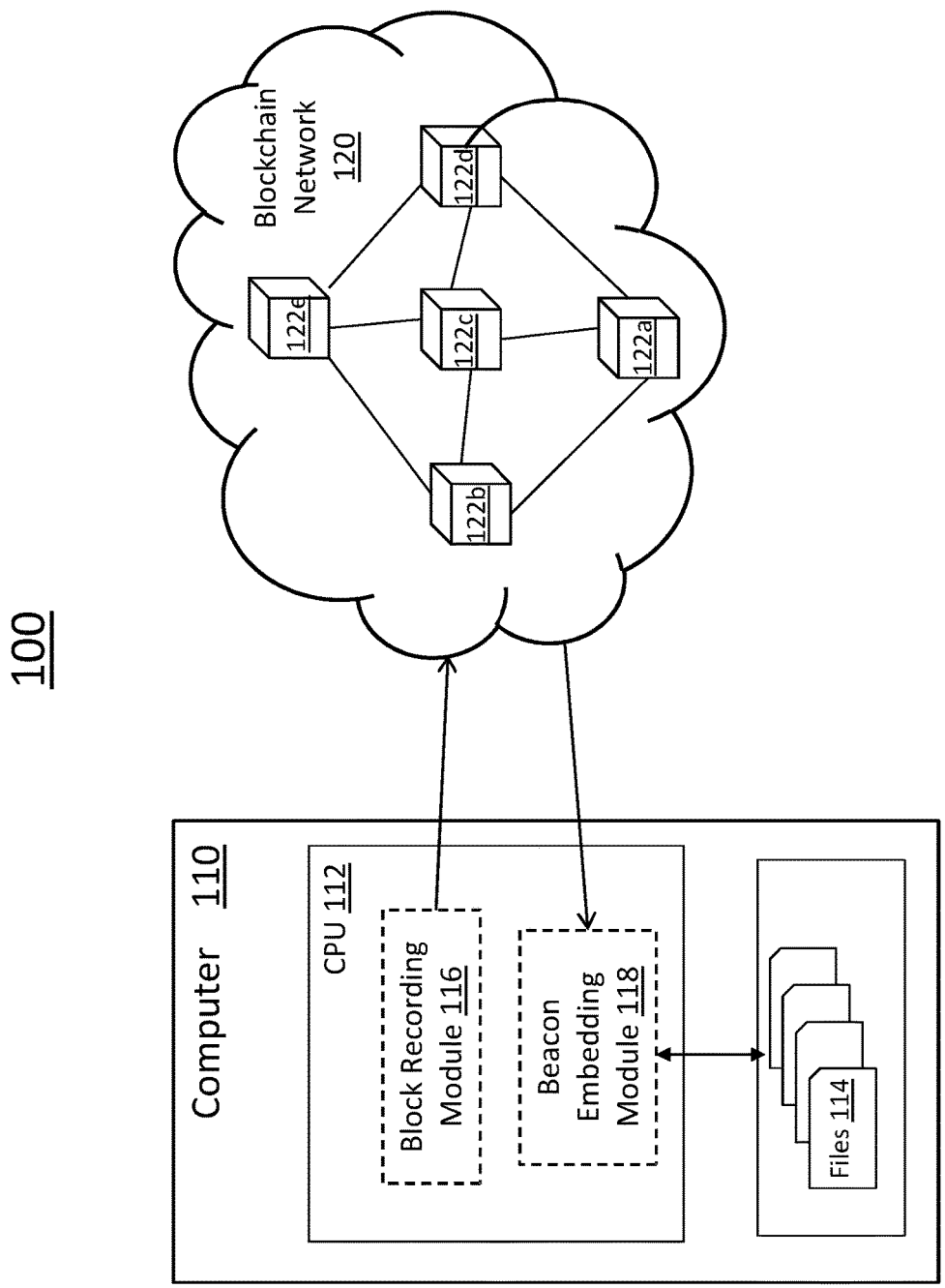

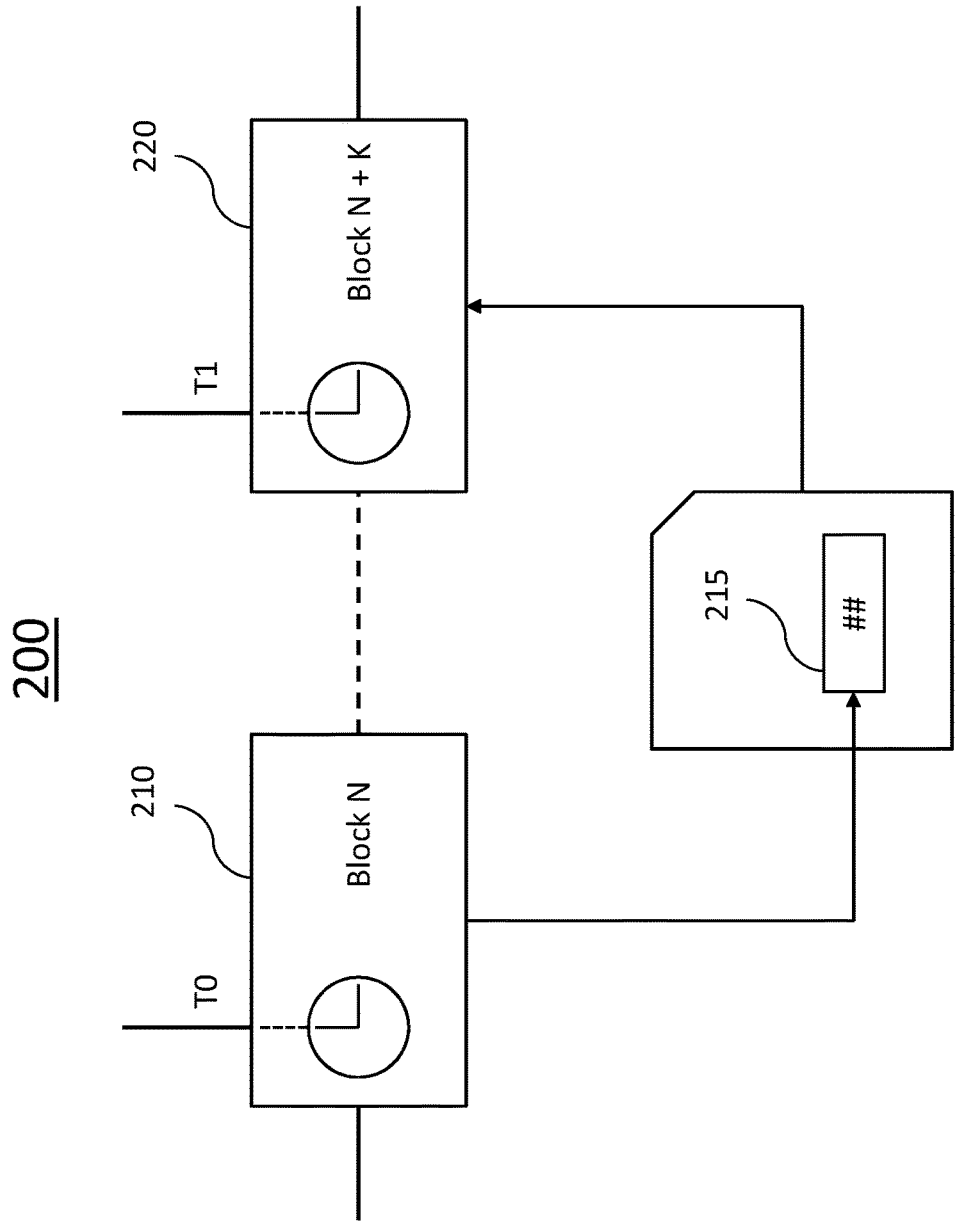

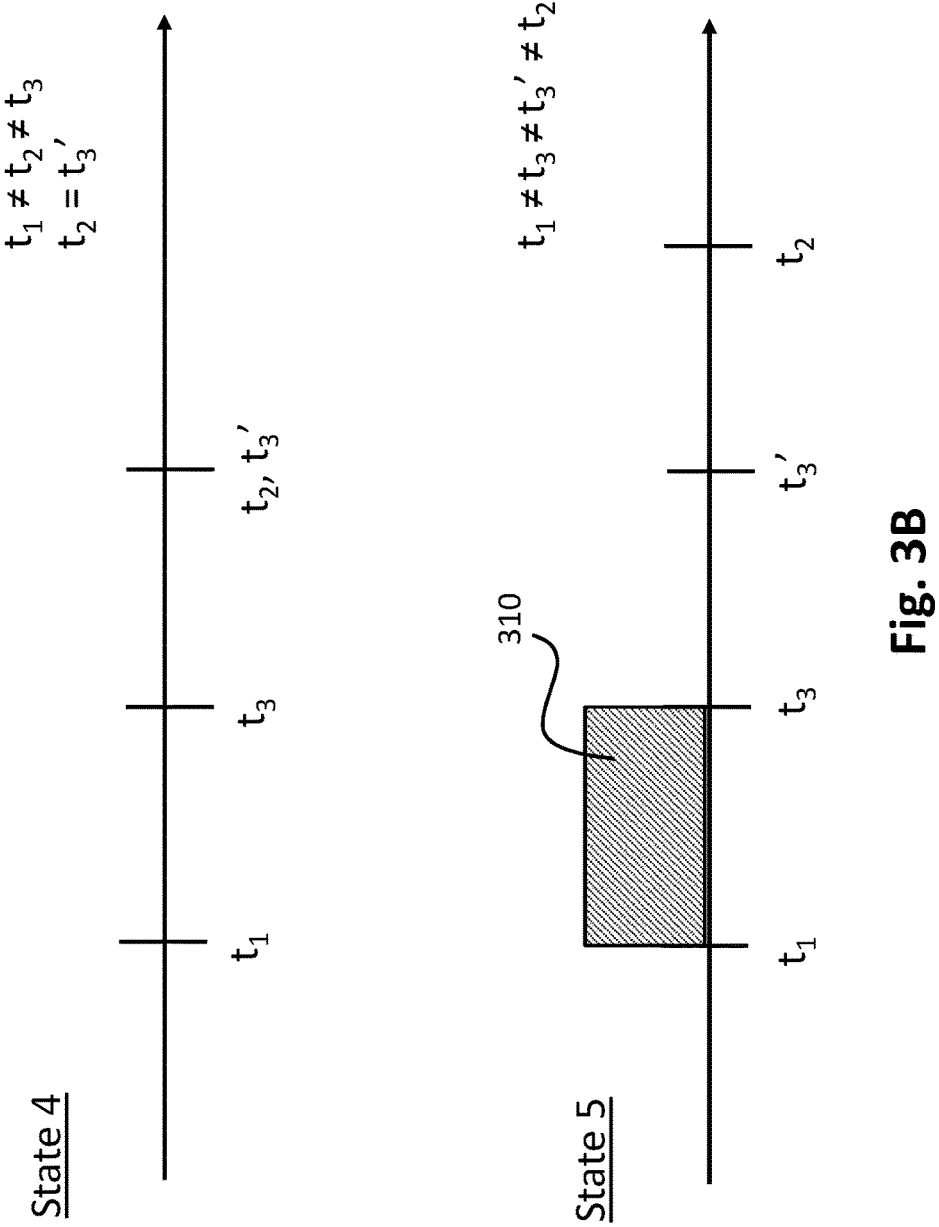

SYSTEM AND METHOD FOR FILE TIME-STAMPING USING A BLOCKCHAIN NETWORK

CROSS REFERENCE TO RELATED APPLICATIONS

The present application claims priority to U.S. Provisional Application No. 62/334,071, filed May 10, 2016, and entitled "System and Method for File Time-Stamping Using Blockchain", the entire contents of which are hereby incorporated by reference.

FIELD OF TECHNOLOGY

The present disclosure generally relates to data storage, and, more specifically to a method and system for verifying the integrity and time when a file was created using blockchain technology.

BACKGROUND

Continuing advances in storage technology provide significant amounts of digital data to be stored cheaply and efficiently. However, there are many situations where data (e.g., user data or corporate data) needs to be stored in a database or in a data storage for a significant amount of time, such as years or even decades. For example, in the United States, certain federal and state laws require that all medical institutions store medical data (e.g., medical history, medical care, regular check-ups and monitoring, etc.) on patients during his or her lifetime, or even longer. Moreover, similar requirements apply to banking and financial institutions. For example, according to international rules (e.g., the Basel Agreement), banks are required to keep all financial information for a certain period of time (e.g., data relating to accounts, customers, performed transactions and other information about movement of funds, etc.). In these situations, financial, medical and other organizations are required to store huge amounts of data.

Being required to store large amounts of data for long periods of time creates problems in that it is necessary not only to preserve this information, but also to ensure the integrity and authenticity. Moreover, over long periods of time, the data may be subject to a number of threats, including, for example, potential damage by software and/or hardware failure, accidental and/or intentional removal or modification, modification or tampering by fraudsters, and the like.

Therefore, storing such large volumes of data presents a separate issue of checking the integrity of the stored data (i.e., integrity check), including being able to verify the time each file has been created. Since the number of stored data objects can be very large, the checking procedures (e.g., audits) of the data by third parties, such as services of financial monitoring or control, is usually quite time-consuming and expensive. This is so since the confirming of the data may require a third party (e.g., bank) to be involved, which is trusted by all parties and which guarantees the safety of the information, but also significantly increases the cost through such services.

One existing technology that is capable of storing large volumes of transactional data is blockchain technology. In general, blockchain technology is most widely known as the technology behind the popular cryptocurrency, Bitcoin. A blockchain creates a history of data deposits, messages, or transactions in a series of blocks where each block contains a mathematical summary, called a hash, of the previous block. In turn, this process creates a chain where any changes made to a block will change that block's hash, which must be recomputed and stored in the next block. This changes the hash of the next block, which must also be recomputed and so on until the end of the chain.

In general, each block in a block chain contains a timestamp and a link to a previous block. The timestamp for each block indicates that time at which point the block was added to the blockchain network. As a result, during a data verification, it can be determined using the timestamp that a file included in a particular block was created before the point in time that the block was added to the blockchain. However, apart from this timestamp, it is difficult to determine a time point after which the file was created. As a result, it is difficult and time consuming under existing technologies to verify when a particular file was created.

SUMMARY

In view of the foregoing problems and existing technologies, it is desired to provide a system and method for limiting required time periods for verifying when a file was created, not only that it was created after a first point in time, but that it was also created before a second point in time.

According to one aspect, a method is provided for time-stamping a file to be added to a blockchain network. In this aspect, the method includes generating, by a processor, a data file; identifying, by the processor, a hash value from a first block previously recorded in the blockchain network; embedding, by the processor, a beacon relating to the hash value in the data file; and recording, by the processor, the data file with the embedded beacon as a transaction in a second block in the blockchain network.

In another aspect, the method further includes identifying the hash value further by generating, by the processor, a hash value of a previous file; searching, by the processor, at least one transaction in the blockchain network to identify the hash value; and identifying, by the processor, a time value corresponding to the identified hash value.

In another aspect, the time value is embedded as the beacon in the data file.

In another aspect, the method includes generating a timestamp when the data file is recorded in the blockchain network, the timestamp being included in the second block.

In another aspect, the method includes verifying the integrity of the data file based on a creation time period between a first point of time associated with the embedded time value and a second point of time associated with the timestamp.

In another aspect of the method, the beacon is at least one of a natural phenomenon, financial data, a crypto token, and a NIST randomness beacon.

In another aspect, the method includes embedding the beacon by embedding a transformed hash associated with the first block previously recorded in the blockchain network.

In an exemplary aspect, a system is provided for time-stamping a file to be added to a blockchain network. In this aspect, the system includes a processor configured to generate a data file; identify a hash value from a first block previously recorded in the blockchain network; embed a beacon relating to the hash value in the data file; and record the data file with the embedded beacon as a transaction in a second block in the blockchain network.

In another aspect, a non-transitory computer readable medium storing computer executable instructions is provided for time-stamping a file to be added to a blockchain network. In this aspect, instructions are provided for generating a data file; identifying a hash value from a first block previously recorded in the blockchain network; embedding a beacon relating to the hash value in the data file; and recording the data file with the embedded beacon as a transaction in a second block in the blockchain network.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 illustrates a block diagram of a system for verifying the integrity and time when a file was created using blockchain technology according to an exemplary aspect.

FIG. 2 illustrates a high level flow diagram for verifying the integrity and time when a file was created using blockchain technology according to an exemplary aspect.

FIGS. 3A and 3B illustrate a timing diagram for creating data (e.g., audio and/or video data) and generating a timestamp for a hash of the file in the blockchain according to an exemplary aspect.

DETAILED DESCRIPTION

Figure 3A:
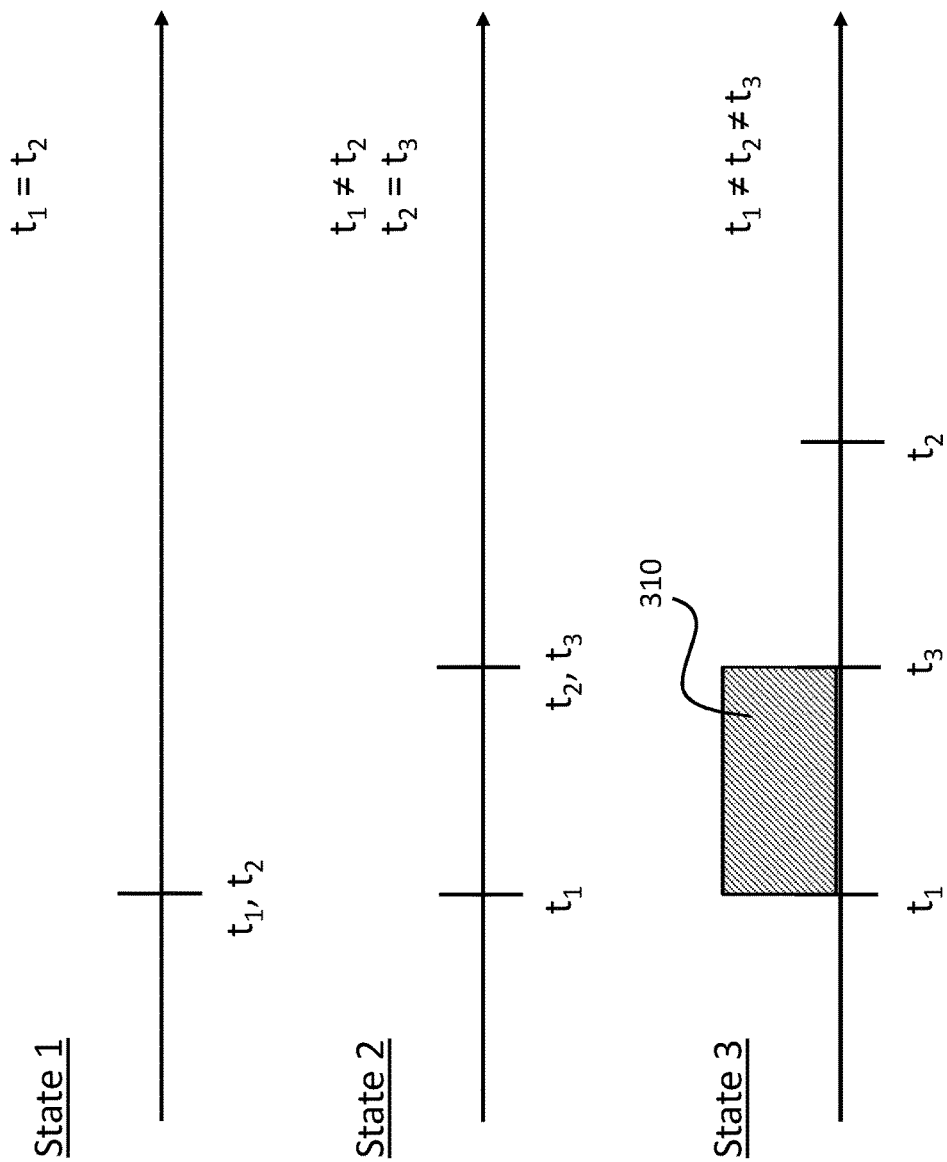

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The present disclosure is directed to a system and method of storing high volumes of data and ensuring integrity and reliability of the data using blockchain technology.

FIG. 1 illustrates a block diagram of a system for verifying the integrity and time when a file was created using blockchain technology. As shown, the system 100 generally includes a computer 110 and a blockchain network 120. An exemplary computer with the detailed hardware and software components capable of performing the disclosed algorithms and functions is described below with respect to FIG. 8. However, as generally shown in FIG. 1, the computer 110 is configured to manage the data storage and verification process, which includes embedding hash (or transformed hash) from a previous block of the blockchain into the file that is added as a transaction as part of the current block into the blockchain. According to the exemplary aspect, the computer 110 may be any type of computing device, such as a laptop, a desktop, a tablet, a mobile phone, a server and the like. The specific hardware details of the exemplary computer 110 will be described below.

As further shown in FIG. 1, the computer 110 is configured to create and/or manage a plurality of files 114, of which at least a portion can be stored in blockchain network 120 as transactions. Although not shown, the computer 110 can generally include hardware and software components configured to manage various storage resources within the computing environment. For example, the computer 110 can include one or more data storage devices (e.g., hard disk drives, optical drives, magnetic tape drives and/or the like) and storage management software that provides an interface to the one or more data storage devices. Moreover, the computer data of data files 114 may be any type of electronic, digital data generated and/or stored by a computer. For example, the computer data can represent text data, executable program code, audio, video or image data, or any other type of digital data. As will be discussed in detail below with respect to the exemplary algorithms, the computer 110 is configured to calculate hash values of files stored thereon and transmit these hash values to blockchain network 120. Additional information can be stored and include the file name, size in bytes, storage transaction number of the file, the timestamp and time beacon data that is calculated based on the previous block stored to blockchain network 120, as will be discussed in detail below.

According to an exemplary aspect, the blockchain network 120 can be an existing (public or private) distributed network formed from a plurality of nodes or computers 122a-122e, for example. In this aspect, the blockchain network 120 maintains a continuously-growing list of data records hardened against tampering and revision and is composed of data structure blocks that exclusively hold the data received from the computer 110 (and other computing devices, servers, etc.) according to the exemplary aspect. In particular, after the computer 110 creates and transmits hash values of one or more of files 114 (discussed in detail below) and transmits such data (and related data) to the blockchain network 120, the transaction in the blockchain records blocks and confirms when (based on the timestamp) and in what sequence the data transactions enter and are logged in the existing blockchain. Preferably, every node (e.g., computers 122a-122e) in the decentralized system has a copy of the growing blockchain. This design avoids the need to have a centralized database managed by a trusted third party. Moreover, each of the nodes 122a-122e can validate the data, add hash values to their copy of the blockchain and then broadcast these additions to other nodes in accordance with existing blockchain methodologies. In general different blockchain networks have different formats for descriptions of transactions. Thus, while all blockchain networks are generally configured to include hash values of the file, other fields can vary from network to network.

According to the exemplary aspect, the computer 110 is configured to transmit data across a network and can include require I/O devices, such as a network interface controller, and the like. The applicable network can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

According to the exemplary aspect, the computer 110 includes a central processing unit ("CPU") 112 provided to, among other things, execute block recording module 116 and beacon embedding module 118. In this aspect, the block recording module 116 and the beacon embedding module 118 include software code (e.g., processor executable instructions) in memory, which may be configured to execute/facilitate the storing and managing of data files in the blockchain network 120, according to an exemplary aspect, as will be discussed in more detail below.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For purposes of this disclosure below with respect to the exemplary algorithms, the disclosure generally refers to the computer 110 and/or CPU 112 and/or one of the specific modules as shown to perform the various steps of the algorithm.

FIG. 2 illustrates a high level flow diagram for verifying the integrity and time when a file was created using blockchain technology according to an exemplary aspect. In general, a flow diagram 200 is shown in which a pair of block 210 (i.e., "Block N") and block 220 (i.e., "Block N+K") are added in sequence to a blockchain network (e.g., blockchain 120 discussed above). For example, the block recording module 116 can be configured to record blocks 210 and 220 in blockchain network 120 as separate blocks within the blockchain. Although the exemplary aspect contemplates that the computer 110 generates files and stores blocks 210 and 220 in the blockchain network 120, it should be appreciated that block 210 can be recorded by another computer, for example.

According to the exemplary aspect, while the computer 110 is generating a data (e.g., a file 114) by recording audio and/or video data for example, the beacon embedding module 118 is configured to read a transformed hash of the last available block (e.g., block 210) in the blockchain network 120. This hash value of the media file is shown as value 215 and can be embedded into the next block 220 either while the data is being generated and/or after it has been generated. The new file with the embedded hash value 215 can then be recorded as part of a transaction in the second block 220 and recorded into blockchain network 120, as further shown. The embedded data 215 (which can be a time beacon, for example) will indicate a first point in time $T_0$ at which point block 210 (i.e., "Block N") was recorded in the blockchain, for example, and a second point in time $T_1$ at which point block 220 (i.e., "Block N+K") was added to the blockchain network 120. As a result, during a subsequent data verification process, the block 220 can provide an independent indication of the time period (i.e., between $T_0$ and $T_1$) when the file that was added as a transaction as part of block 220.

FIGS. 3A and 3B illustrate a timing diagram for creating data (e.g., audio and/or video data) and generating a timestamp for a hash of the file in the blockchain according to an exemplary aspect. State 1 illustrates an initial state at time $t_1$ where the computer 110, for example, begins recording data, which can be, for example, audio or video data being recorded by a camera function of the device (e.g., a smartphone or tablet). Moreover, time tz as shown in each of states 1-5 represents the current time. Thus, for state 1, time $t_1$ is equal to time $t_2$.

Next, at state 2, the recording of the data is stopped at time $t_3$, such that time $t_3$ is equal to time $t_2$, as the current time. At that point, the particular file is complete. Thus, state 3 further represents the recorded data (i.e., bytes 310) between times $t_1$ and $t_3$, i.e., the recording start time and the recording stop time. Moreover, time $t_2$ is the current time that is shown to be some later point in time after the recording by the computer 110 is stopped at time $t_3$. State 4 illustrates a similar view as state 3 in which time $t_2$ is shown to be equal to time $t_3'$. According to the exemplary aspect, at this point in time (which can be any point after the recording stopped at time $t_3$), the block recording module 116 is configured to timestamp a hash of the created data file that is added to as a transaction to a block (e.g., block 210 or 220) in the blockchain network 120.

Finally, state 5 illustrates a complete timeline of the process. As shown, the data (e.g., audio and/or video data) is created as a file between time periods $t_1$ and $t_3$. After the file is created at time $t_3$, the file can be added as a transaction as part of block to blockchain network 130 at time $t_3'$. Thus, the time $t_3'$ is effectively the time the block is added to the blockchain network 120. As noted above, this time can be represented in the block as a timestamp of the hash of the file in the blockchain. Accordingly, during a subsequent verification process, it can be read by accessing the timestamp in the blockchain that the file was created before time $t_3'$.

Figure 4:
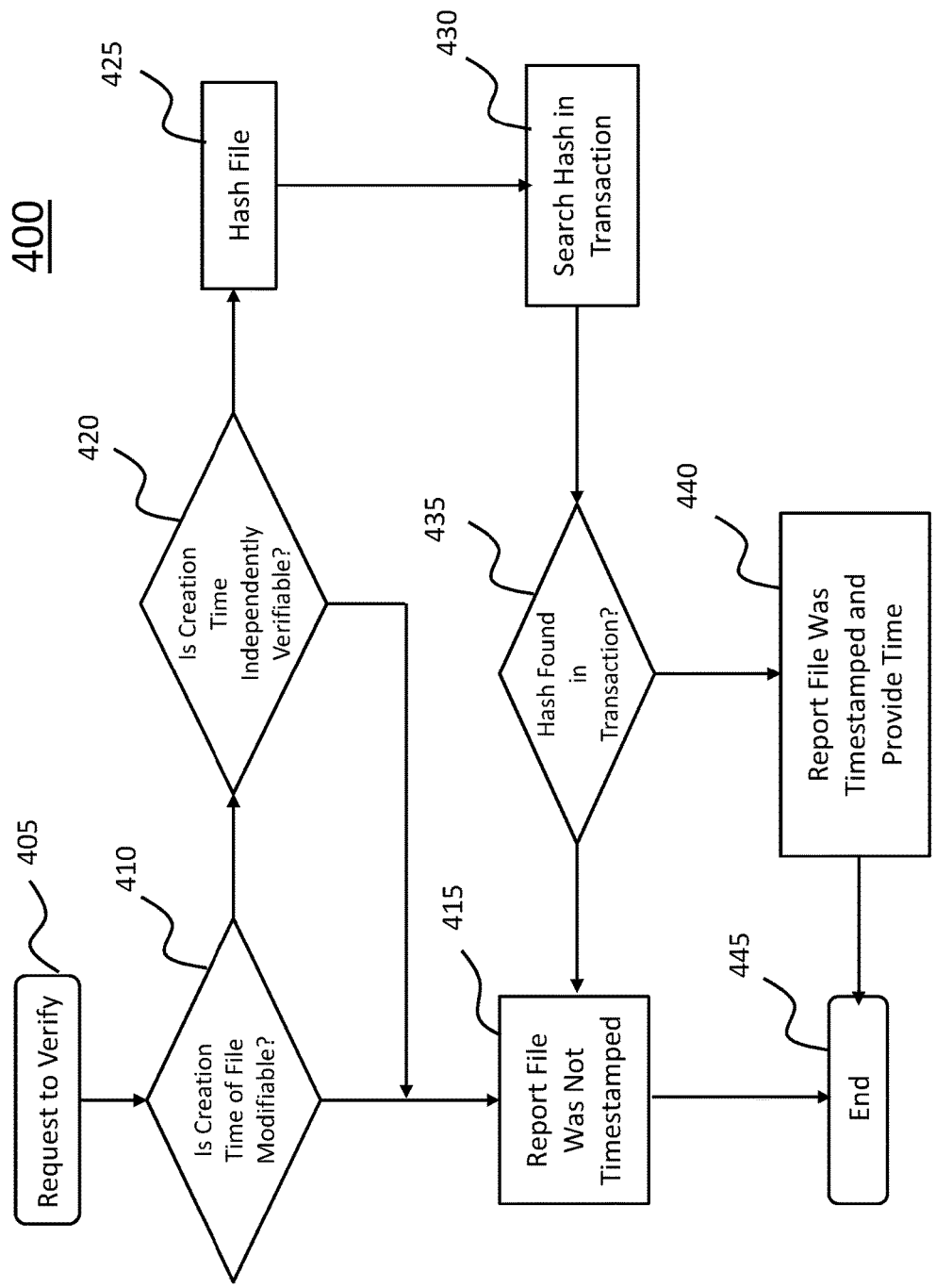
FIG. 4 illustrates a method for verifying a timestamp of a file according to an exemplary aspect.

FIG. 4 illustrates a method for verifying a timestamp of a file according to an exemplary aspect. In general, computer 110 is configured to verify whether a timestamp was generated for a particular file that was created when it was added to the blockchain (as described above) and further identify the actual time. As shown, initially at step 405, the computer 110 may receive a request to verify the timestamp of a file (e.g., one of files 114) that have been added to a blockchain network, such as network 120. It should be appreciated that this method 400 can be performed as the reading of the transformed hash of the last available block in the blockchain network while the data for the next file is being generated, as described above and can be performed by one or more of the modules, such as beacon embedding module 118.

Once the process is initiated, the computer 110 performs an initial check at step 410 to determine whether the creation time of the actual file is modifiable. If the file does not have a modifiable creation time, the method proceeds to step 415 and reports that the file was not timestamped. In other words, since the creation time cannot be modified, the file was not able to be timestamped. Once this report is generated at step 415, the method ends at step 445, at which point the computer 110 can (optionally) verify a timestamp of another previous file.

In the alternative, if the creation time of the file is determined to be modifiable at step 410, the method proceeds to step 420 where the computer 110 determines whether it can independently check that the creation time of the file was modified. Again, if this creation time cannot be independently checked, then the computer cannot rely on it as an accurate time and will again proceed to step 415 as described above. Alternatively, if the creation time can be independently checked, the method proceeds to step 425 where a hash of the file is created at step 425. In general, It should be appreciated that the hash value of the data file (e.g., one of files 114) can be calculated using known values with the resulting value having a fixed size. For example, the hash value of the data file can be calculated using the MD5 hashing algorithm, resulting in a 128-bit hash value, or using the SHA-256 hashing algorithm, resulting in a 256-bit hash value, applied to the value of the DATA field, including the braces and stripped of spaces and line break symbols, for example. It should be appreciated that the disclosure is not limited to these two common hashing algorithms according to an alternative embodiment. Moreover, it should be appreciated that the same hashing algorithm should be used to initially create the transaction for the previous block in the blockchain network 120 and then subsequently used to verify the timestamp according to the exemplary algorithm shown in FIG. 4.

Once the hash value of the file is created at step 425, the computer 110 (e.g., beacon embedding module 118) is configured to search the transactions in the blockchain network 120 for the hash value at step 430. If the hash value cannot be identified at step 435, the method again returns to step 415 where it is reported that the file was not timestamped. However, if the hash value is identified in the transaction of the blockchain network at step 435, the method proceeds to step 440 where it is confirmed that the file was indeed timestamped and also reports the actual time value of the file. The method then ends at step 445.

As noted above, it should be appreciated that based on the timestamp identified for the file in the blockchain, the computer 110 can determine that the file was created on or before the time identified by the timestamp. However, it should also be appreciated that in general, a hash and timestamp obviously cannot be generated before all of the bytes of the file have been generated. In other words, the computer 110 must wait until the file is completed before generating the hash and timestamp and adding the file as a transaction in the block to the blockchain network. As a result, the exemplary system and method described herein provides a mechanism for separately indicating a starting point in time that indicates a time in which the file must have been created on or after this time.

Figure 5:
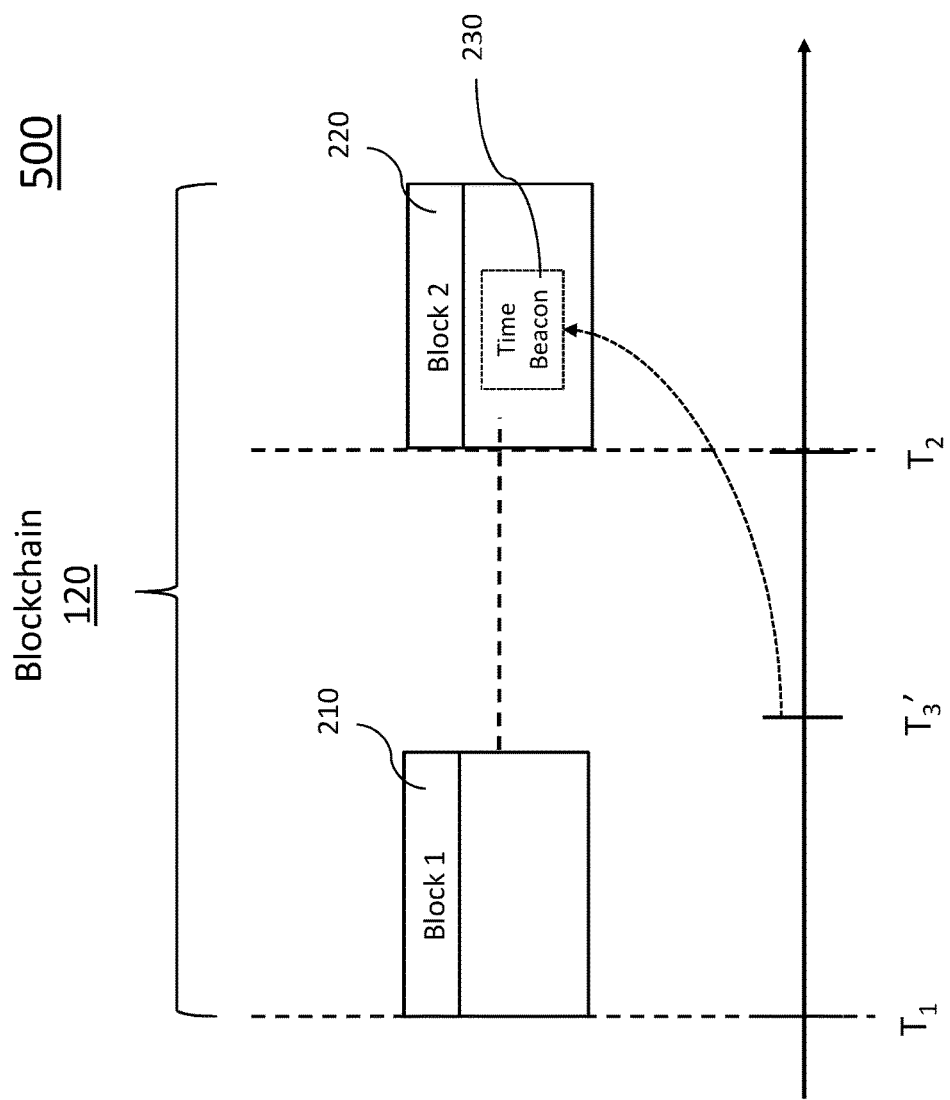
FIG. 5 illustrates a timing diagram of a method for verifying the integrity and time when a file was created using blockchain technology according to an exemplary aspect.

FIG. 5 illustrates a timing diagram 500 of a method for verifying the integrity and time when a file was created using blockchain technology. As shown, a pair of blocks 210 and 220 are added to a blockchain network, such as blockchain network 120 described above. Moreover, as shown, the file for block 1 (i.e., block 210) is created at time $T_1$ and the file for block 2 (i.e., block 220) is created at time $T_2$. Moreover, as further described above, time $t_3'$ is the point in time at which block 1 is added to the blockchain network 120, which can be represented as a timestamp. More particularly, it is assumed that at time $t_3'$, the computer 110 (e.g., block recording module 116) is configured to record a file as a transaction in the blockchain network 120 by generating a hash of the file and also timestamping the file. The timestamp for this first file (also referred to as a "previous" file) indicates the actual time $t_3'$.

Moreover, according to the exemplary aspect, at time $T_2$, while the computer 110 is generating the data for block 2, the computer 110 (e.g., beacon embedding module 118) can independently verify the timestamp for block 1, using the algorithm described above with respect to FIG. 4, for example.

Figure 6:
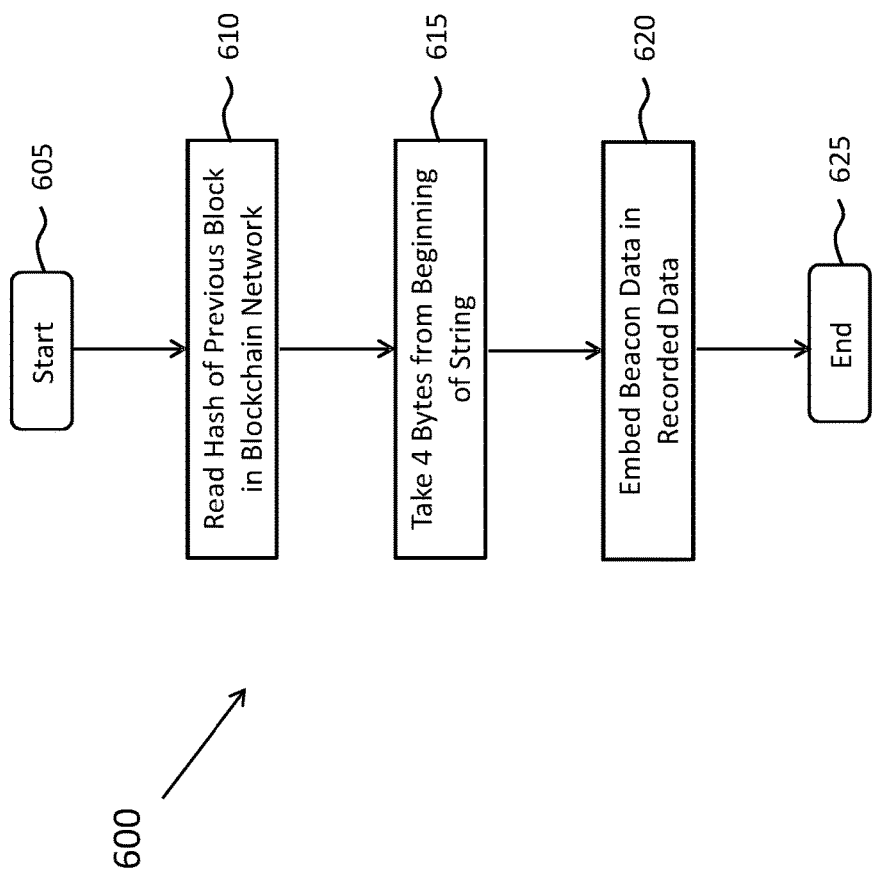
FIG. 6 illustrates a flowchart for a method of embedding beacon data into a file according to an exemplary aspect.

FIG. 6 illustrates a flowchart for a method 600 of embedding beacon data into a file according to an exemplary aspect. The method begins a step 605 in which a current file is being generated for a block (e.g., block 220) and a time beacon is to be added to this block. At step 610, a hash of the previous block (e.g., block 210) can be identified from blockchain network 120 (e.g., steps 430-440) as described above. Next, at step 615, a number of bytes (e.g., four bytes) at the beginning of the string of the hash is read to identify the timestamp of the previous block. Then, at step 620, the beacon embedding module 118 of the computer 110 is configured to generate a time beacon indicating the time value from the previous file and embed this time beacon into the recorded data of the current file (i.e., the file that will be added a transaction into block 220). Finally, the method ends at step 625.

Referring back to FIG. 5, the time beacon 230 is shown to be embedded in the file for block 220. In other words, the time beacon 230 can indicate the time $t_3'$ at which the block 210 was added to blockchain network 120. Moreover, the block 220 will have its own timestamp for when it was added to the blockchain network 120. As a result, during a subsequent verification of the file corresponding to block 220, the block 220 will include both the time beacon 230 indicating time $t_3'$ and the timestamp of block 220. That is, the computer 110 will know that the file was created after the time $t_3'$ and on or before its own timestamp when it was added to the blockchain network 120.

Figure 7:
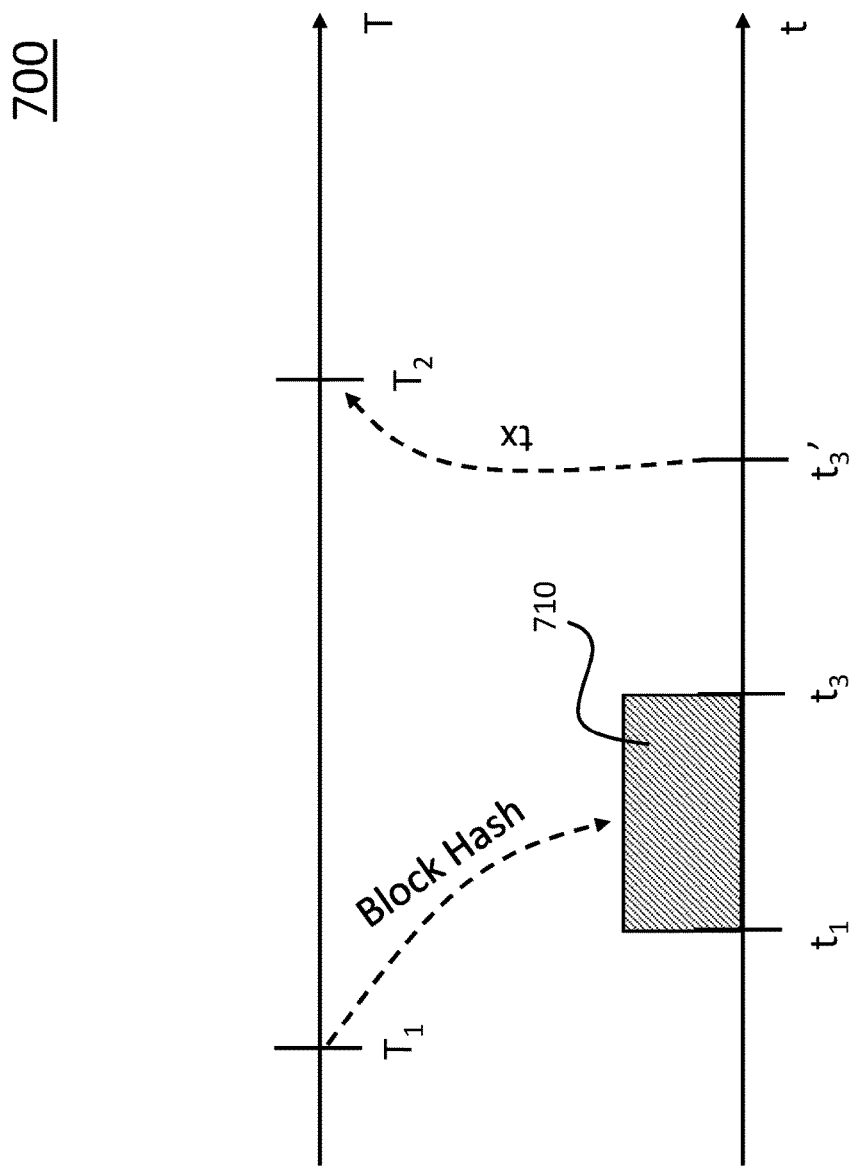
FIG. 7 illustrates another exemplary timing diagram for generating a block in s blockchain according to an exemplary aspect.

FIG. 7 illustrates another exemplary timing diagram 700 for generating a block according to an exemplary aspect. As shown, the file 710 is generated between times $t_1$ and $t_3$. Moreover, during the creating of the file (e.g., the data bytes), the hash value from the previous file (i.e., the "block hash") is embedded into the file. Subsequently, at time $t_3'$, the file is added as a transaction (e.g., as block 220) to the blockchain network 120. As noted above, the embedded beacon can include a time value of the previous block 210, for example. Thus, block 220 includes information that defines a limited required time for verifying when the file 710 was created. Advantageously, the computer 110 is configured to read and verify a timestamped file and analyze that publicly observed data (e.g., the time beacon) existed after a certain time period and was embedded into the file.

According to the exemplary aspect, the embedded beacon is a time value derived from a previous block in the blockchain network. However, it should be appreciated that according to alternatively aspects, the beacon data can be any type data that can be used to indicate that the file was created after a certain point in time. For example, the beacon data can be related to natural phenomena (e.g., sun temperature), financial data, a crypto token, a NIST randomness beacon, or the like. In any event, the exemplary aspects are provided to embed certain time information into a file that is added to a blockchain so that during a subsequent verification of the file, the block includes information that limits the verification for the creation time of the file.

Figure 8:
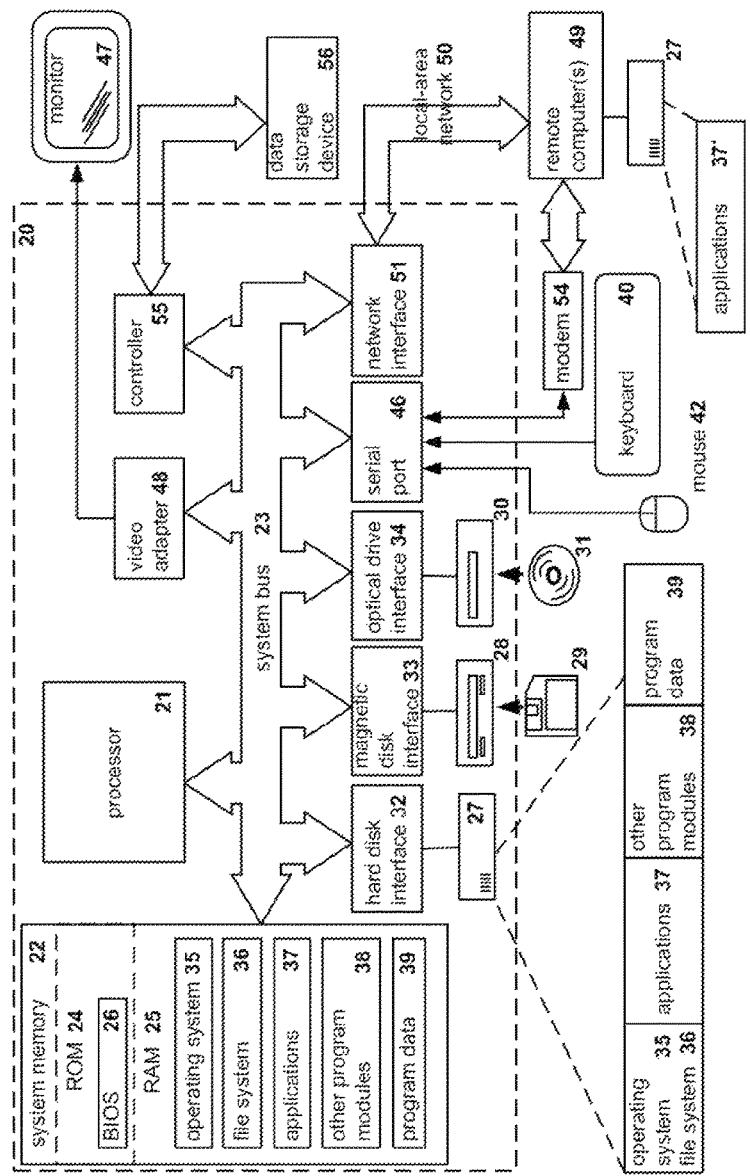
FIG. 8 illustrates an example of a general-purpose computer system on which the disclosed systems and method can be implemented.

FIG. 8 illustrates an example of a general-purpose computer system (which may be a personal computer or a server) on which the disclosed systems and method can be implemented according to an example aspect. It should be appreciated that the detailed general-purpose computer system can correspond to the computer 110 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 112 of FIG. 1, according to an exemplary aspect.

Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remove computer(s) 49 can correspond to a plurality of nodes (e.g., nodes 122a-122e) forming blockchain network 120, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for verifying integrity of files using a blockchain network, the method comprising:
   generating, by a processor, a hash of a first data file;
   searching, by the processor, for the hash among transactions in the blockchain network;
   identifying, by the processor, the hash from a first block in the blockchain network and a time value corresponding to the hash, wherein the first block was recorded in the blockchain network at a first point in time;
   generating, by the processor, a beacon containing the time value corresponding to the hash;
   embedding, by the processor, the beacon in a second data file;
   generating, by the processor, a hash of the second data file with the embedded beacon;
   recording, by the processor, the hash of the second data file with the embedded beacon as a part of a transaction in a second block in the blockchain network, wherein the second block is recorded at a second point in time subsequent to the first point in time; and
   verifying, based on an analysis of the embedded beacon and the hash of the second data file, that the second data file was generated between the first point in time and the second point in time.

2. The method according to claim 1, further comprising generating a timestamp when the second data file is recorded in the blockchain network, the timestamp being included in the second block.

3. The method according to claim 2, further comprising verifying the integrity of the second data file based on a creation time period between the first point of time associated with the embedded time value and the second point of time associated with the timestamp.

4. The method according to claim 1, wherein the beacon is at least one of a natural phenomenon, financial data, a crypto token, and a randomness beacon.

5. The method according to claim 1, wherein the embedding of the beacon comprises embedding a transformed hash associated with the first block previously recorded in the blockchain network.

6. A system for verifying integrity of files using a blockchain network, the system comprising:
   a hardware processor configured to;
     generate a hash of a first data file;
     search for the hash among transactions in the blockchain network;
     identify the hash from a first block in the blockchain network and a time value corresponding to the hash, wherein the first block was recorded in the blockchain network at a first point in time;
     generate a beacon containing the time value corresponding to the hash;
     embed the beacon in a second data file;
     generate a hash of the second data file with the embedded beacon;
     record the hash of the second data file with the embedded beacon as part of a transaction in a second block in the blockchain network, wherein the second block is recorded at a second point in time subsequent to the first point in time; and
     verify, based on an analysis of the embedded beacon and the hash of the second data file, that the second data file was generated between the first point in time and the second point in time.

7. The system according to claim 6, wherein the hardware processor is further configured to generate a timestamp when the second data file is recorded in the blockchain network, the timestamp being included in the second block.

8. The system according to claim 7, wherein the hardware processor is further configured to verify the integrity of the second data file based on a creation time period between the first point of time associated with the embedded time value and the second point of time associated with the timestamp.

9. The system according to claim 6, wherein the beacon is at least one of a natural phenomenon, financial data, a crypto token, and a randomness beacon.

10. The system according to claim 6, wherein the hardware processor is further configured to embed the beacon by embedding a transformed hash associated with the first block previously recorded in the blockchain network.

11. A non-transitory computer readable medium storing computer executable instructions for verifying integrity of files using a blockchain network, including instructions for:
    generating a hash value of a first data file;
    searching for the hash among transactions in the blockchain network;
    identifying the hash from a first block in the blockchain network and a time value corresponding to the hash, wherein the first block was recorded in the blockchain network at a first point in time;
    generating a beacon containing the time value corresponding to the hash;
    embedding the beacon in a second data file;
    generating a hash of the second data file with the embedded beacon;
    recording the hash of the second data file with the embedded beacon as a part of a transaction in a second block in the blockchain network, wherein the second block is recorded at a second point in time subsequent to the first point in time; and
    verifying, based on an analysis of the embedded beacon and the hash of the second data file, that the second data file was generated between the first point in time and the second point in time.

12. The non-transitory computer readable medium according to claim 11, further comprising instructions for generating a timestamp when the second data file is recorded in the blockchain network, the timestamp being included in the second block.

13. The non-transitory computer readable medium according to claim 12, further comprising instructions for verifying the integrity of the second data file based on a creation time period between the first point of time associated with the embedded time value and the second point of time associated with the timestamp.

14. The non-transitory computer readable medium according to claim 11, wherein the beacon is at least one of a natural phenomenon, financial data, a crypto token, and a randomness beacon.

* * * * *